Jan. 23, 1951  L. A. BRASWELL  2,538,756
EXHAUST DRIVEN SPREADING DEVICE
Filed Sept. 10, 1947  2 Sheets-Sheet 1
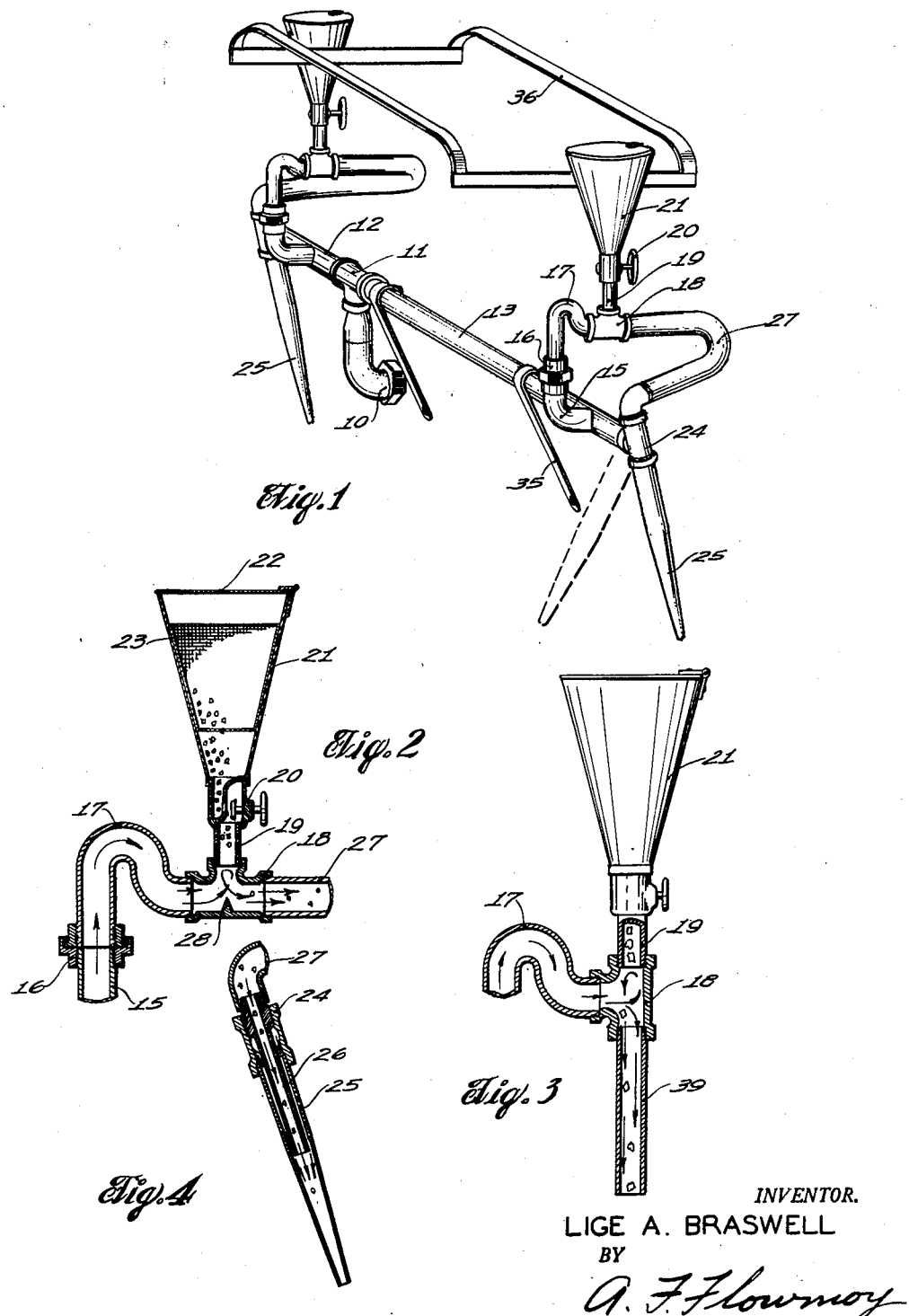
INVENTOR.
LIGE A. BRASWELL
BY
A. F. Flournoy Jan. 23, 1951  L. A. BRASWELL  2,538,756
EXHAUST DRIVEN SPREADING DEVICE
Filed Sept. 10, 1947  2 Sheets—Sheet 2

INVENTOR.
LIGE A. BRASWELL
BY
A. F. Flournoy

Patented Jan. 23, 1951

2,538,756

UNITED STATES PATENT OFFICE 2,538,756

EXHAUST DRIVEN SPREADING DEVICE

Lige A. Braswell, Wisner, La.

Application September 10, 1947, Serial No. 773,232

5 Claims. (Cl. 275—2)

My invention relates to an exhaust-driven spreading mechanism particularly adapted to be attached to the exhaust manifold of a farm tractor or other vehicle for use in planting, fertilizing or spraying poison upon growing crops.

An object of my invention is to provide a means of utilizing the wasted exhaust gases of a tractor or other vehicle by passing these gases through various exhaust chambers and beneath a prepared hopper in a manner to cause the substance placed in the hopper to be evenly withdrawn therefrom through an outlet nozzle.

Another object of my invention is to provide a means of regulating the flow of the seed or other substance from the hopper.

Another object of my invention is the provision of a safety trap to prevent the substance being ejected from the hopper from entering the main exhaust chambers during the "breathing" periods of the motor.

Another object of my invention is to provide a spreading mechanism that may be easily installed upon a tractor and may be used to plant, fertilize or poison a multiplicity of rows at a single passing.

Still another object of my invention is to utilize the periodic exhaust bursts from the motor as an agitating means to prevent the substance in the hopper from becoming clogged or otherwise restricting the outlet flow therefrom.

A further object of my invention is to provide a jet mechanism adapted for use in the outlet nozzles to increase the pressure therethrough, such jets being particularly advantageous in the spreading of powdered poisons.

Further objects and advantages will be found in the following detailed description when viewed together with the accompanying drawing in which:

Fig. 1 is a perspective view of a device embodying my invention in an exhaust driven spreader, the same being arranged for the spreading of a powdered poison.

Fig. 2 is a cross sectional view through a hopper and flow control mechanism showing the direction of flow of the exhaust gases and the substance in the hopper.

Fig. 3 is a partially broken view of the elements of Fig. 2, showing an alternate method of connecting the outlet nozzle to the hopper.

Fig. 4 is a cross sectional view of the outlet nozzle with a jet element installed therein.

Figure 5:
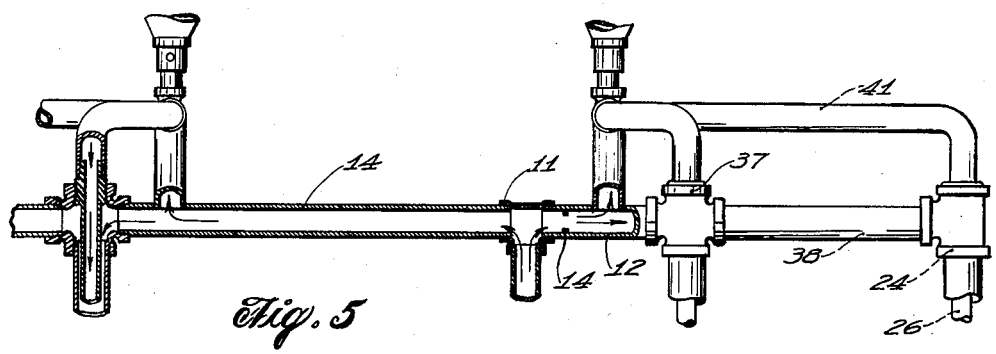
Fig. 5 is a partially broken longitudinal view of the exhaust chambers assembled for four row operation.
Figure 6:
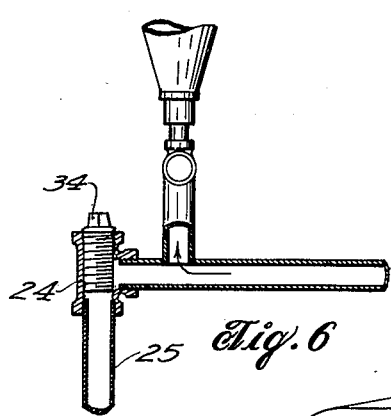
Fig. 6 is a partially broken view through the end of the exhaust chamber showing the outlet nozzle adapted for use in a fertilizer spreading operation.

Fig. 1 of the drawings shows my device arranged particularly for the spraying of powdered poison. Numeral 10 designates a coupling adapted to be attached to the manifold outlet of a combustion engine. It is to be remembered that this coupling 10 will necessarily assume various shapes and positions due to the location of the manifold on different type vehicles. The coupling 10 terminates in a T 11 which is in turn engaged by two exhaust chambers 12 and 13. Due to the position of the manifold outlet on various vehicles, these chambers will occasionally be different in length, thus creating a greater exhaust pressure in one chamber than in the other. In order to equalize these pressures, I have introduced an orifice or choke 14 (Fig. 5) in the shorter chamber 12 of such diameter as to maintain equal pressures in both the chambers 12 and 13. In the event that the coupling 10 could be placed centrally of the ends of the two chambers 12 and 13, the choke 14 could be dispensed with altogether.

Near the ends of both the exhaust chambers 12 and 13 I have placed a by-pass 15 provided with a universal coupling joint 16 to which is attached a trap 17. This trap 17 is simply a loop, the high point of which is considerably above the transverse passageway of the T 18. In all combustion engines, especially during a quick deceleration of the motor, instead of exhaust pressure being created, there is a slight vacuum in the exhaust lines due to sudden stoppage of the exhaust pressure. This is called "breathing" of the motor. Without my trap 17 the substance in the hopper 21 might be sucked into the exhaust chambers during these breathing periods and interfere with the flow of the exhaust gases therethrough. While the gases are free to flow backward through the trap 17 they are not of sufficient pressure to overcome the force of gravity which holds the particles of substance on the inside leg of the trap. The particles of substance that might be caught in the trap 17 will be properly discharged upon a subsequent burst of the exhaust from the motor. The trap 17 is provided with a T 18 supporting an inlet flow pipe 19 and a flow control valve 20. The flow control valve 20 is attached directly to the bottom of a cone-shaped hopper 21. In this instance I have provided the hopper 21 with a hinged lid 22 used to keep the substance placed therein from spilling and also to keep poison dust from disturbing the driver of the vehicle to which my invention is attached. It will be noted that the hopper is made cone-shaped to allow the substance therein to fall easily through the flow control valve 20 and on through the outlet pipes. I have also provided a removable screen 23 for the hopper which is used to sift the substance placed therein in order to prevent clogging of any of the pipes.

On the outer ends of the exhaust chambers 12 and 13 I have placed additional T's 24 which are rotatably mounted on their respective exhaust chambers. The lower opening of the T 24 carries a nozzle 25, a cross section of which is shown in Fig. 4. Arranged to be removably inserted into the upper opening of the end T 24 is a jet 26 provided with a flexible substance discharge tube 27 attached to its upper end and connected to the hopper 21. Note that the main body of the jet 26 is smaller in diameter than that of the nozzle 25 in which it is mounted; nor does it completely restrict the opening of the end of the exhaust chambers. Thus the exhaust gases coming from the exhaust chambers 12 and 13 may enter the nozzle around the jet 26 as well as assist in discharging the substance of the hopper through the flexible tube 27. Such a construction is made particularly for the use of powdered poisons and is highly advantageous in spraying growing crops such as cotton, wherein I simply adjust my spraying nozzle 25 to a desired angular degree where the poison will reach up under and through the foliage instead of just settling on the top thereof.

A more complete understanding of the action of the device is obtained by reference to Figure 2 of the drawing. It will be remembered that, due to the presence of the jet 26 in the outlet nozzle 25, a portion of the exhaust pressure will be diverted through the by-pass 15. The gases will flow through the trap 17 and will be temporarily diverted in the T 18 by a small baffle 28 which causes a turbulent effect as shown by the arrows in the drawing. This turbulence of gases occurs in periodic sequence with the firing of the motor and is used to agitate the substance in the hopper 21 to prevent it from ever becoming clogged or otherwise stopping the free gravity flow through the control valve 20. In this instance the control valve 20 is provided with the conventional valve and seat which may be manually adjusted to any desired opening.

Figures 7, 8:
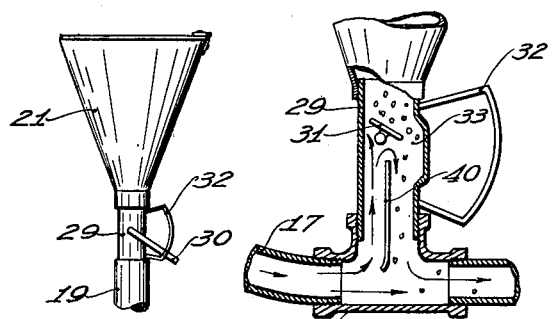
Fig. 7 is an elevational view of the hopper and a modified flow control valve.
Fig. 8 is a cross sectional view through the modified control valve.
Figure 9:
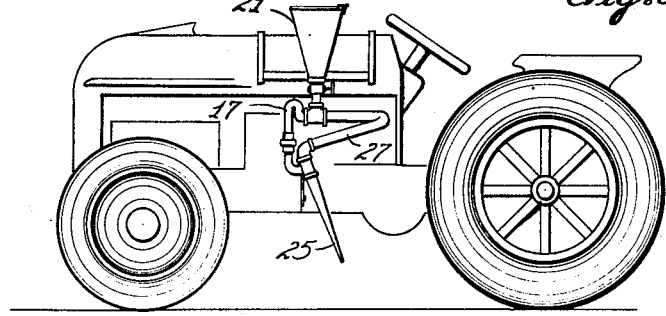
Fig. 9 is a side view of a tractor showing my exhaust driven spreader mounted on the same.
Figure 10:
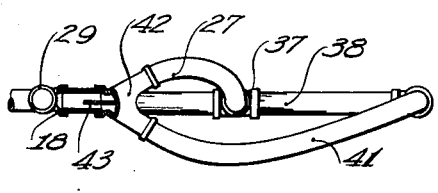
Fig. 10 is a partially broken plan view of the assemblage of elements illustrated in Fig. 5.

In Figs. 7 and 8 I show a control valve in modified form which consists in a tubular housing 29 placed between the T 18 and the upper hopper 21. Rotatably mounted in the housing 29 is a control lever 30 provided with a butterfly valve 31. The end of the control lever is embraced by frictional guide members 32 which may be calibrated to indicate various degrees of openings of the butterfly valve 31. Note that the portion of the control lever which extends through the housing is slightly off the diametrical axis of the housing 29, and also that I have provided a pocket 33 in one of the side walls of the housing 29. Thus when the butterfly valve 31 is opened, there is a greater space on one side than the other due to the addition of the pocket 33. This will allow seeds of a general diameter, but actually varying in size, to pass the butterfly valve 31 and obviate the fear of the passageway ever becoming clogged.

Arranged to be supported by the valve housing 29, I have provided a baffle plate 40 having its lower end positioned slightly below the level of the top wall of the T 18 and its upper end terminating just below the butterfly valve 31. This baffle 40 is used to divert a small portion of the exhaust coming from the trap 17 upwardly into the valve housing 29 and direct it to the shorter side opening of the butterfly valve 31 to produce violent agitation of the lower portion of the substance in the hopper 21. At the same time a portion of the exhaust is allowed to pass under the baffle 40, thus creating a slight vacuum on the opposite side of the baffle 40 which greatly assists in drawing the substance from the hopper 21 through the pocket 33 and thence to the outlets of the device.

The above description and operation has been primarily concerned with the use of powdered poisons. My invention may also be advantageously used in planting and in distributing commercial fertilizers. To adapt my mechanism for the use of seeds or fertilizers I disconnect the flexible discharge tube 27 and the jet 26 and insert a plug 34 into the upper ends of the T's 24, thus blocking out all exhaust gases through the nozzles 25 and by-passing them through the hopper mechanism. I have found that sufficient exhaust pressure can be obtained to adequately distribute even the heaviest of seeds and fertilizers, the pulsation of the exhaust gases being sufficient to agitate the substance in the hopper 21 and allow it to be freely discharged. Should the substance be of such density as to require additional agitation I have provided an arrangement for such additional agitation as shown in Fig. 3 of the drawing, which shows a slightly different arrangement of the T 18. In this instance the exhaust gases, coming through the trap 17, will be substantially divided between the outlet 39 and the inlet flow pipe 19. Thus the increased, periodic bursts of the exhaust gases will be sufficient to agitate the denser substance in the hopper 21 and allow it to fall into the path of the escaping gas through outlet 39. It will be remembered that the dry exhaust gases greatly assist the distribution of any powdered substance by ridding the substance of its moisture content. In the distribution of fertilizers, the outlet 39 may be either a rigid pipe or flexible hose arranged to dispense the fertilizer into the prepared rows.

In the arrangement as shown in Fig. 1, I have provided suitable mounting brackets 35 to be attached to the tractor or other vehicle carrying my device. I have also provided suitable cross braces 36 to act as stabilizers between a pair of hoppers, and arranged to rest upon the gas tank of the tractor as shown in Fig. 9.

While I have described a device including two hoppers for a two row operation, the same system may be employed in the use of a single hopper or a multiplicity of hoppers. In Fig. 5 of the drawing I show the end T 24 as replaced by a cross 37, the extra opening of which is adapted to receive an extra exhaust chamber 38 together with an additional outlet pipe 25 and jet 26. In Fig. 10 it will be noted that this dual system may be attached to a single hopper by providing a Y-connection 42 to the T 18. This Y-connection 42 is provided with a separating baffle 43 which is arranged to divide the substance coming from the hopper between the inner and outer discharge outlets. In this manner half of the substance will be discharged through the tube 27 and the other half through the discharge tube 41. Since the same construction is mounted on both sides of the tractor, four rows of a crop may be sprayed, planted or fertilized simultaneously.

My device is so positioned on a tractor that it does not interfere with the driver, with the working mechanism of the tractor or with the attachments that might be hooked to the tractor. Since my device is well forward of the plows of the tractor, as many as four rows can be seeded or fertilized and the rows covered in one single operation, thus effecting a considerable saving to the farmer.

When my device is not in use it may be removed from the tractor by loosening the universal couplings 16 and the jets 26 or plugs 34 and simply capping these openings with a conventional pipe plug. The exhaust gases will now be discharged through the nozzles 25 in the conventional manner. It will be remembered that the exhaust chambers 12 and 13 and all of the other passages are made larger than any of the conventional manifold outlets. In this way free passage of the exhaust gases to the atmosphere is never restricted at any time.

Another novel feature that is readily apparent after the above description of operation is that regardless of the speed of the tractor the amount of the substance in the hoppers will be discharged proportionally. For instance, an operator sets the control valves for the distribution of a given amount of commercial fertilizer from the hoppers and then sets the throttle of his tractor for slow speed. Since the distribution of the fertilizer depends solely upon the exhaust of the vehicle for its distribution, it is readily apparent that the operator will obtain a slow distribution. Now, without changing his control valves, the operator decides to quicken the speed of the tractor. The same volume of fertilizer as set by the control valve will be dispensed at a more rapid rate due to the greater exhaust of the motor. Thus any volume from the hoppers may be evenly distributed at varying rates of speed of the vehicle without the necessity of changing the volume control valve.

While I have described my invention in detail, it is obvious that the dimensions of the elements of the device may be varied widely in order to adapt the invention to various types of vehicles. It is also obvious that many minor changes can be made without departing from the spirit and scope as defined by the following claims.

I claim:

1. An exhaust driven spreading device adapted for use in combination with a tractor or other vehicle, comprising an elongated exhaust chamber, means for connecting said exhaust chamber to the manifold outlet of said vehicle, a swivelly mounted outlet pipe extending from the outer end of said exhaust chamber, a by-pass conduit positioned inwardly of the outer end of said exhaust chamber and extending upwardly therefrom, a hopper mounted above said by-pass conduit and adapted to contain a substance to be spread, said by-pass conduit being in communication with said hopper, a substance discharge tube extending from said hopper adapted to be received in said outlet pipe, valve means for controlling the flow of substance from said hopper, means for utilizing the power of the exhaust bursts of a combustion motor through said by-pass conduit to direct gases upwardly into said hopper for agitating the substance placed within said hopper, said valve means comprising a vertically disposed cylindrical tube interposed between said hopper and said by-pass conduit, a valve operatively connected to a control lever pivotally mounted off the transverse axis of said tube, means for adjusting said valve to various degrees of opening or closing, and an indenture formed in one of the side walls of said tube beneath said valve adapted to form an enlarged discharge passageway on one side of the valve when said valve is opened to allow particles of a substance of approximately the same size to be discharged through said outlet.

2. The device as claimed in claim 1 wherein the means for utilizing the power of the exhaust bursts from the combustion motor to agitate the substance in said hopper comprises a vertically disposed baffle positioned axially within said tube and dividing the same into a forward and rear compartment, said baffle terminating at its upper end below said valve means and having a portion of its lower end projecting into the path of the exhaust that passes through said by-pass conduit, whereby a portion of the exhaust gas bursts is diverted upwardly into the forward compartment of said tube to agitate a substance in said hopper, which substance in said hopper is disposed to fall through the rear compartment having its pressure reduced caused by the passing of the remainder of the exhaust gases beneath said baffle.

3. An exhaust driven spreading device adapted for mounting on a tractor or other combustion motor driven vehicle comprising a coupling for attaching the same to the manifold outlet of a combustion motor, a pair of unequal length exhaust chambers extending outwardly from said coupling in a manner to receive a portion of the exhaust from said motor driven vehicle, means in the shorter of the two exhaust chambers for lowering the pressure therein down to the pressure in the longer of said exhaust chambers, a by-pass conduit positioned near the end of each of said exhaust chambers and communicating with the same, a hopper mounted above each of said by-pass conduits and connected therewith, said by-pass conduits being adapted to receive exhaust gases entering said chambers, said hoppers adapted to contain a heavy powdered substance to be spread, and a frame for supporting said hoppers in symmetrical transversely spaced positions with respect to the vehicle.

4. An exhaust driven spreading device adapted for mounting on a tractor or other combustion motor driven vehicle, comprising a coupling for attaching the same to the manifold outlet of said combustion motor driven vehicle, a pair of elongated exhaust chambers connected to said coupling and extending outwardly therefrom in opposite directions toward the sides of said combustion motor driven vehicle, a swivelly mounted outlet conduit connected to the outer end of each of said exhaust chambers, a pipe fitting mounted on each of said outlet conduits for attaching an additional exhaust chamber and an outlet conduit thereto, a by-pass conduit connected to each of said first mentioned exhaust chambers adapted to receive a portion of the exhaust from said combustion motor driven vehicle, a hopper mounted above each of said by-pass conduits, said hoppers adapted to contain a finely divided substance, each of said hoppers provided with a main discharge pipe branching into a pair of discharge pipes connected into said outlet conduits of said exhaust chambers, whereby exhaust gases coming from said combustion motor driven vehicle will pass beneath each of said hoppers and entrain the finely divided substance falling from said hoppers through said substance discharge pipes, and a rig for suspending said hoppers adjacent opposite sides of the vehicle.

5. An exhaust driven spreading device adapted for use in combination with a combustion motor driven tractor or the like comprising a frame adapted for mounting on said vehicle, a hopper attached to said frame, said hopper provided with a discharge opening and adapted to hold a charge of finely divided substance, an exhaust chamber, means for connecting said chamber to the manifold outlet of a combustion motor, a by-pass conduit communicating with said exhaust chamber and said hopper adapted to divert exhaust gases into said hopper, said by-pass conduit including an upwardly extending tube bent to form a return bend projecting substantially above the level of said manifold outlet of the combustion motor and above the level of said by-pass conduit and constituting a trap for use in preventing particles of the substance falling through the outlet of said hopper from entering said exhaust chamber.

LIGE A. BRASWELL.

REFERENCES CITED

The following references are of record in the file of this patent:

UNITED STATES PATENTS

| Number | Name | Date |
|---|---|---|
| 568,776 | Leggett | Oct. 6, 1896 |
| 797,253 | Banister | Aug. 15, 1905 |
| 808,236 | Hahn | Dec. 26, 1905 |
| 922,582 | Hauck | May 25, 1909 |
| 1,282,697 | Johnson | Oct. 22, 1918 |
| 1,459,418 | Scott | June 19, 1923 |
| 1,541,919 | Briggs | June 16, 1925 |
| 1,673,087 | Morse | June 12, 1928 |
| 2,244,987 | Faulkner | June 10, 1941 |

FOREIGN PATENTS

| Number | Country | Date |
|---|---|---|
| 180,468 | Great Britain | June 1, 1922 |